US007747875B2

(12) United States Patent
Cookson et al.

(10) Patent No.: US 7,747,875 B2
(45) Date of Patent: Jun. 29, 2010

(54) SYSTEM TO ENSURE THAT ALL AUDIO-VISUAL OPTICAL DISC TYPES ARE PROPERLY SCREENED FOR WATERMARKS

(75) Inventors: Christopher J. Cookson, Studio City, CA (US); Spencer Stephens, Toluca Lake, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 244 days.

(21) Appl. No.: 11/422,245

(22) Filed: Jun. 5, 2006

(65) Prior Publication Data

US 2006/0277418 A1    Dec. 7, 2006

Related U.S. Application Data

(60) Provisional application No. 60/687,100, filed on Jun. 3, 2005.

(51) Int. Cl.
*G06F 12/14* (2006.01)
(52) U.S. Cl. .............................. 713/193; 726/27; 726/33
(58) Field of Classification Search ............. 726/26–33; 713/193
See application file for complete search history.

(56) References Cited

U.S. PATENT DOCUMENTS 5,700,999 A * 12/1997 Streicher et al. ............ 235/381

7,102,973 B1 * 9/2006 Carson ..................... 369/53.21
2005/0246529 A1 * 11/2005 Hunt et al. .................. 713/168
2006/0143453 A1 * 6/2006 Imamoto et al. ............ 713/169

OTHER PUBLICATIONS

Noble et al "The case for transient authentication", Proceedings of the 10th ACM SIGOPS European Workshop, Saint-Emillion, France, Sep. 2002.*

* cited by examiner

*Primary Examiner*—Benjamin E Lanier
*Assistant Examiner*—Hadi Armouche
(74) *Attorney, Agent, or Firm*—Gottlieb, Rackman & Reisman, P.C.

(57) ABSTRACT

An apparatus for processing data and content includes at least one drive and a player (that may be implemented by software). At least some of the content is protected using a content scrambling scheme such as audio or video watermarking. The drive and player cooperate to operate in a lockable mode wherein if protected content is provided to the drive, the drive and player are interlocked so that the content is presented by the player only in accordance with consistent with protection scheme being used, and cannot be presented by any other player. Moreover, in the locked mode, protected content may not be accepted from any other drive. The drive and player are switched to an unlockded mode by presenting to the drive unprotected content.

6 Claims, 3 Drawing Sheets

| State<br><br>Disc Type | Lockable | Permanently Unlocked |
|---|---|---|
| Protected | Play with licensed player | Cannot be played |
| Other Supported Media Type | Play with licensed player | Play with any player |
| Data | Accessible by any application | Accessible by any application |

TABLE 1 COMPARISON OF LOCKABLE AND PERMANENTLY UNLOCKED STATES

FIG. 2

SYSTEM TO ENSURE THAT ALL AUDIO-VISUAL OPTICAL DISC TYPES ARE PROPERLY SCREENED FOR WATERMARKS

RELATED APPLICATIONS

This application claims priority to U.S. Provisional application Ser. No. 60/687,100 filed on Jun. 3, 2005 and incorporated herein by reference.

BACKGROUND OF THE INVENTION

A. Field of Invention

This invention pertains to a system with a disc drive and a player. In one mode of operation, the two can be locked so that only discs having special characteristics, such was watermarks are played. Once unlocked, the disc driver and player can play other types of discs, such as data discs.

B. Description of the Prior Art

The use of audio and video watermarks in audio-visual works has been established as a practical means of inhibiting unauthorized distribution of commercial content (henceforth referred to as just "content"). A hidden mark is embedded in either the audio or the visual image of the work to be protected. The hidden mark typically has the following characteristics:

1. It does not impede enjoyment of the work. For example, a video watermark is "invisible" when viewed under normal viewing conditions.
2. It resists attempts to remove it. This is typically accomplished by technology that ensures that enjoyment of the work is substantially impaired if the mark is removed. For example, an audio watermark cannot be removed from the sound track of an audio visual work without serious degradation to the sound track.
3. It can carry data indicating, for example, the ownership of the work, the location in which it was created or the presence or absence of other watermarks on the disc.

A watermark system consists of two parts:

1. An embedding system.
2. A detection system.

The embedding system is usually integrated into the authoring process so that at some point prior to the work being replicated and/or distributed the mark is inserted. Embedding watermarks is a well-known practice. For example, if the work were to be distributed on a DVD-Video disc the mark would be embedded into the content after compression and before encryption with the content protection system. Optical discs are used as the primary example in this document but the invention described herein is equally applicable to many other means or media of content delivery.

The watermark system serves one of two specific purposes.

One purpose is for forensic tracking of content. In connection with such a purpose, content is marked with an individually tailored watermark code that represents some information relating to where or to whom the content is to be sent. For example, the mark might identify the particular vendor that was used for a part of the production process, the movie theatre that a film is sent to for projection, or a person to whom a "screener" copy of the work was sent to ahead of its release to normal distribution channels. In this case, the detection system is controlled by the content owner so that when content is found in unauthorized circumstances, it is possible to trace where and/or to whom the content was originally delivered. For example, a forensic mark in a motion picture found on a peer-to-peer network might indicate the identity of the person who legitimately received a screener copy of the motion picture.

The other purpose is for controlling playback and/or recording of content. Here content is marked with a well-known mark that is detected in real time or better in any device that renders (plays) or records the content. Here, the detection system is in the playback or recorder system and outside the control of the content owner.

For the purposes of this document we will mainly consider playback control, although much of this discussion applies equally to record control and should be understood as such. When watermarks are used for playback control the detection system must be activated when (or, preferably, before) the content is played. If the watermark is detected outside of the allowable usage then playback will stop, while if the watermark is detected within the allowable usage then playback will proceed. If the detection system is turned off or by-passed it cannot prevent the unauthorized playback of marked content. Some device (e.g. video disc players) manufacturers are reluctant to incorporate detection systems (or incorporate such systems which are easily bypassed via widely available input codes) since they perceive that they may be placed at a market disadvantage in relation to a competitor that does not incorporate the detection system. The detection system is intended to prevent the playback of unauthorized content. Therefore, devices that incorporate detection systems may be unattractive to consumers who are interested in viewing unauthorized content such as pirated DVD-Video discs that carry the watermark.

With respect to current systems, contractual obligations are often the key to the incorporation of detection systems in player and recorder devices. Typically a device manufacturer will need to obtain access to content protected by a particular content protection scheme, such as Content Scramble System ("CSS"), and will, as a result, accept a detection obligation in order to also obtain the needed access license.

The effectiveness of contractual obligations, however, varies. It depends on various factors such as the specific delivery method(s) covered. For example, in the case of optical discs, the contractual obligation may apply to all types of optical discs, or may be limited to just the types associated with the content protection system that requires the obligation as part of its license. The effectiveness of contractual obligations also depends on the implementation of the detection system in the device and, for example, whether it can be bypassed.

A personal computer using the Microsoft Windows operating system, ("Microsoft Windows™ PC") serves as an example of the limitations of the current state of the art. In the Microsoft Windows™ PC, the detection system might be resident in the licensed player for a content protection system (CPS) that can be referred to as CPS-A. That player might be configured as the default player for optical disc types S, H and V. If a disc of any of these three types is inserted into the PC optical disc drive, Windows™ will cause the default player for that particular type of disc to be launched—in this case, the licensed player. Upon launch, the detection system attempts to detect the watermark and, if detected within the allowed usage (as it should be), the licensed player plays the content.

However, CPS-A might only be used on disc type H. Therefore it is only necessary to have the licensed player be the default player for type H. The user may therefore choose to set the default to player for types S and V to be a player that is not licensed under CPS-A watermark detection system. By doing so, disc types S and V are no longer screened for the watermark, and will play the disc regardless of whether the watermark is present. Because Windows™ is an open operating system, there is no way to prevent a user from changing the default player for disc types S and V. If that is done, the effectiveness of the detection system is effectively nullified.

SUMMARY OF THE INVENTION

In the situation described above, when CPS-A is used to protect optical discs, a special drive must be used during playback—i.e., one that can detect CPS-A. Such is the situation with CSS protected DVD-Video discs. A CSS licensed drive is required for a CSS protected disc to be read.

One of the features of special drive, which we will call a licensed drive because the special features are licensed as part of CPS-A, is a protocol called drive authentication. Here the drive exchanges secret signals or handshakes with the licensed player so that one authenticates itself to the other.

Drive authentication can be accomplished in two ways:

One-way drive authentication: where typically the licensed player authenticates the licensed drive as the source of content the player is preparing to play.

Two-way drive authentication: where the licensed player authenticates the drive as above, and the drive authenticates that it is passing content only to a licensed player. While, at present, two-way drive authentication is used in the CSS protection system, it is of limited utility since once the licensed drive has authenticated that a licensed player is running on the PC, any other application also running on the PC can also access the content on the disc.

In contrast, effective two-way drive authentication, as used under the current state of the art, ensures that content can only be passed from a CPS-A protected optical disc via the licensed drive to the licensed player. Other applications are locked out from accessing the licensed drive when it contains a CPS-A protected optical disc since they are not authenticated.

In two-way drive authentication as used under the current state of the art, the lock on the licensed drive continues until the protected disc is ejected. If another CPS-A protected disc is inserted the process starts again from scratch. If a disc that is not protected by CPS-A is inserted, including discs of type S and V, the drive authentication is not reinstated and any application can access the contents of the disc.

This invention is an improvement over the current state of two-way drive authentication which shall be referred to as Persistent Two-way Drive Authentication ("P2DA"). P2DA permits the licensed drive to remain locked to the licensed player until the system is reset. Conventional two-way drive authentication only lasts as long as the session created to play a particular protected disc. Once the session ends, so too does authentication.

Under the P2DA system, the first initialization of the licensed player causes the player to conduct the persistent two-way drive authentication process with the licensed drive, creating a lock between the licensed drive and the licensed player. This two-way drive authentication may not incorporate all aspects of the full two-way drive authentication inasmuch as the complete authentication might also use parameters from the disc.

Once initialization of a P2DA session has completed the licensed drive is locked and cannot be used by other applications, including other unlicensed players to play content-containing discs. Thus the user cannot usefully configure an unlicensed player to play other content-containing discs. If an unlicensed player tries to access the drive after the P2DA session has been initialized, it will be denied access to the disc.

Clearly this would also lock out any access to licensed drive that is legitimate, for example a Windows™ application attempting to read data files from the disc. Thus the licensed player has the ability to unlock the drive for the time that any disc is in the drive.

In one mode of operation, when a new disc is put into the tray of the licensed drive, and the tray is closed, the licensed drive will cause a disc insertion notification to be sent to the operating system. The disc insertion notification will cause the operating system to call the licensed player to determine the type of disc inserted. If the licensed player determines that the disc is on its protection list the drive will remain locked to the licensed player, but if the licensed player determines that the disc is not on its protection list it will allow the drive to be temporarily unlocked until a new disc is inserted. The protection list might include discs of types S, H and V but not discs of type D. D might be a data disc type, where the data on the disc is assumed to be content of a type that can be screened by the detection system.

Subsequent to the licensed player unlocking the drive any application running on the PC can access the data on the disc.

Thus, if the disc inserted into the licensed drive is of a content type then it will be played and screened by the licensed player while if the disc is not of a content type the disc can be accessed by any application running on the PC. This will ensure that discs containing content are properly screened for the watermark by the licensed player while at the same time permitting the drive to be used for other purposes.

BRIEF DESCRIPTION OF THE DRAWINGS

FIG. 2 shows a table with a comparison between system behavior when the drive is in the Lockable and the Permanently Unlocked states.

DETAILED DESCRIPTION OF THE PREFERRED EMBODIMENT

Figure 1:
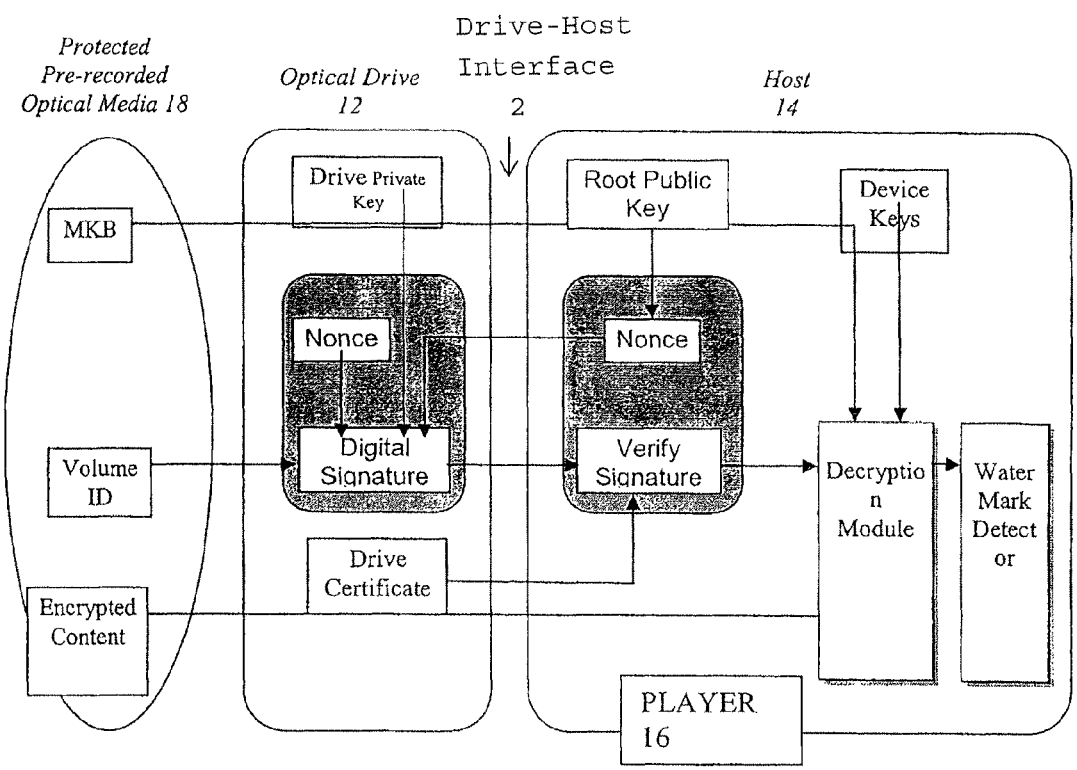
FIG. 1 shows a block diagram of a PC an interlocked disc drive and disc in accordance with this invention.

FIG. 1 shows how the invention is applied to a PC such as a PC with Microsoft Windows™ operating system 10. The PC has a plurality of well-known elements and only the elements that play a role in the subject invention are discussed herein. As seen in the Figure, the PC 10 includes an optical drive 12 connected by a drive-host interface 2 to a host microprocessor 14. The microprocessor 14 runs several applications, including, in this case, a player application 16. It should be understood that the player may be implemented by hardware as well. Both the drive 12 and the player 16 include several well known elements that need not be described here. A disc 18 can be inserted into the drive 12 so that its contents can be displayed by player 16. The disc drive 18 is hereinafter referred to as the licensed drive because it has several modes of operation as described below, and in the table of FIG. 2.

The licensed drive 18 has two states. In the 'lockable' state, the drive can be authenticated by a licensed player. In the 'permanently unlocked' state the drive does not authenticate with a licensed player.

Lockable State

1. Initialization of Lockable State:
   (a) Two-way drive authentication is conducted between the licensed drive 18 and the licensed application (player 16). This is preferably done without using any disc dependent parameters so that it can be conducted prior to the insertion of a protected disc. Optionally a further step of authentication may be used once a protected disc is inserted in the drive.

(b) Upon authentication of the disc 18, the licensed drive state is set to 'locked' so that it is only accessible by a licensed player, such as player 16.

2. Action upon Disc Insertion with Drive in Lockable State:

(a) Insertion of disc 18 triggers a call to the licensed player 16 or some component thereof.

(b) The licensed player 16 checks disc type of disc 18 using Media Key Block ("MKB"). If the disc type is of a type that requires content on the disc 18 to be screened then the licensed player 16 plays the content on the disc 18 and screens it while doing so.

(c) If the disc type is not of a type that requires content to be screened then the licensed player 16 unlocks drive 12 and permits any application to access the licensed drive 12 while that disc is in the drive.

3. Action on Disc Ejection while in Lockable State:

The licensed drive reverts to "locked" state and awaits the next disc insertion.

Permanently Unlocked State

To change the state of the licensed drive from the Lockable to Permanently Unlocked, the licensed application (player 16) performs a permanent unlock of drive. This operation may be performed automatically in response a predetermined set of criteria, and/or in response to a command from a user. While in the permanently unlocked state any application can access discs in the drive, but a licensed player 16 cannot authenticate with the licensed drive and therefore the drive cannot be used to play protected discs. If it is desired to play protected discs, the licensed player is re-initialized into the lockable state.

In the preferred implementation the licensed drive state can be changed between lockable and permanently unlocked only a small number of times before the drive will remain permanently in one state.

In an alternate embodiment of the invention, the licensed application causes a protection list of disc types that are to be locked to be transferred to the licensed drive such that the licensed drive only maintains the lock when it detects discs of types on the protection lists.

In yet another embodiment, the user can reconfigure the licensed player to permit discs of a certain type to be accessed by other applications.

Figure 1A:
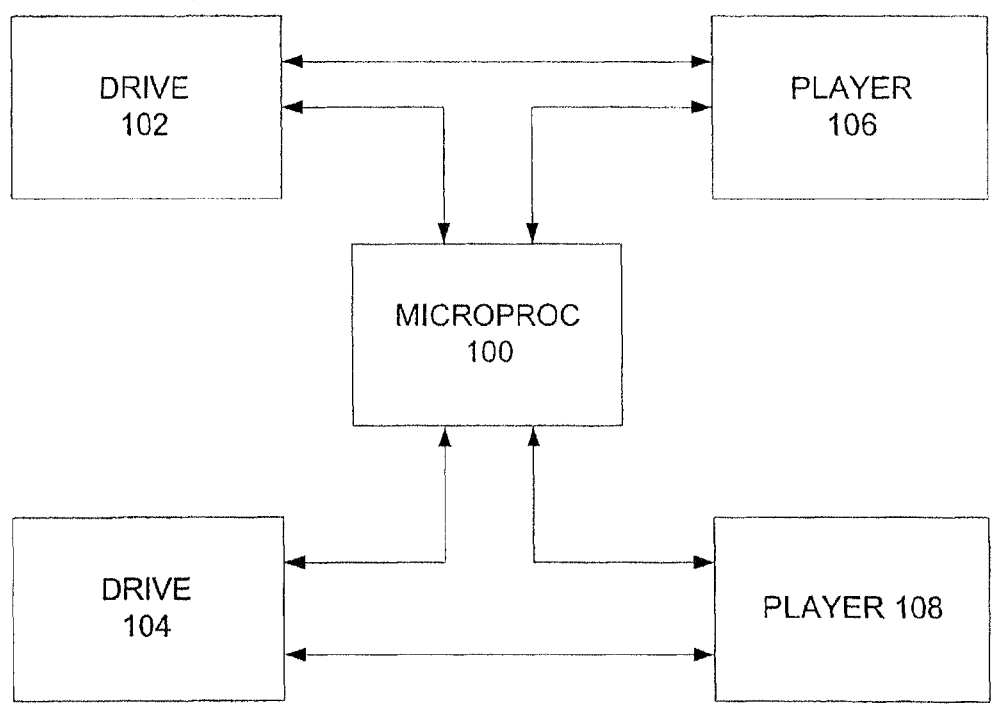
FIG. 1A shows a generalized diagram of a PC with two drives and two players.

In the description provided above, the invention is described in conjunction with a PC 10 with a drive 12 and a player 16. Of course, the invention is applicable to devices with other configurations as well. Moreover, these devices need to be PC-type devices but can be other types of devices, such as DVD players, and the like. For example, FIG. 1A shows a device with a microprocessor 100 associated with a first drive 102, a second drive 104, a first player 106 and a second player 108. The term "drive" in this context covers any means that can read (and, optionally, write) data and content in various formats from various sources and the term "player" covers means that can render content into visual and/or audio presentations on the PC. In accordance with this invention, the device can have several modes of operation, including a lockable mode, a locked mode and an unlocked mode. In the lockable mode, unprotected media inserted (or otherwise provided to) in either drive can be presented by either player. When a protected media is inserted into a drive, one of the players (or other means) locks a respective player and the drive together. For example, the drive 102 and the player 106 can be locked to each other. Thereafter, the content in the protected format can be read only by drive 102 and played only by player 106. If content is loaded onto drive 104, it will be rejected, and similarly, player 108 could be used to play the content. In one mode, the drive 102 cannot be used to read any other type of content. The device can be unlocked only by resetting it.

In another mode, if the disc is removed from the drive 102, and another disc is inserted, the player 106 checks the new disc and if it has unprotected content (or data), this content can be presented or otherwise processed (or accessed) by player 106, 108 or by any other means. However, a protected content is provided to the drive 102, it can be presented only by player 106 (the licensed player).

The device can also have a permanently unlocked mode in which unprotected content can be played by either drive or any other means but protected content cannot be presented by any player. This mode can be disabled by a resetting the device.

Numerous modifications may be made to this invention without departing from their scope as defined in the appended claims.

We claim:

1. A system for using a plurality of discs including protected discs and an unprotected discs, said system comprising:

a drive receiving a disc, wherein said drive sends a notification to said system after receiving said disc, said system automatically calling a player to determine whether said disc is a protected or an unprotected disc; and said player selectively presenting contents from said drive, wherein said player and drive cooperate to operate in one of a lockable and a locked mode, said player operating in said one of a lockable and locked mode based on said determination, wherein in said lockable mode, content from unprotected discs is accessible for reading and wherein when a protected disc is inserted into said drive, said player and said drive switch into said locked mode wherein content from said protected disc is only accessible from said drive, said player and said drive remaining in said locked mode until said system is reset;

wherein said drive is monitored to determine how many times the drive is switched to said locked mode and after said locked mode occurs a predetermined number of times, the drive is permanently set to a certain state and this certain state is not changed by subsequent insertions of disc.

2. The system of claim 1 wherein said drive and player cooperate to operate in an unlocked mode wherein content from unprotected discs is is accessible.

3. The system of claim 1 wherein said modes are selected based on a one way drive authentication.

4. The system of claim 1 wherein said modes are selected based on a two way drive authentication.

5. The system of claim 1 wherein said modes are selected based on a persistent drive authentication.

6. The system of claim 1 wherein said system is further adapted to access a disc list including a plurality of disc designations and wherein the determination of whether to lock or not lock the drive is made based on whether the inserted disc is on said list or not.

* * * * *